(12) United States Patent
Kwon et al.

(10) Patent No.: US 7,260,146 B2
(45) Date of Patent: Aug. 21, 2007

(54) EQUALIZING METHOD AND APPARATUS FOR SINGLE CARRIER SYSTEM HAVING AN IMPROVED EQUALIZATION PERFORMANCE

(75) Inventors: Yong-sik Kwon, Seoul (KR); Jin-hee Jeong, Seoul (KR); Jung-jin Kim, Daegu (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 726 days.

(21) Appl. No.: 10/620,413

(22) Filed: Jul. 17, 2003

(65) Prior Publication Data

US 2004/0156459 A1   Aug. 12, 2004

(30) Foreign Application Priority Data

Feb. 6, 2003   (KR)   ............ 10-2003-0007589

(51) Int. Cl.
  *H03H 7/40*   (2006.01)
(52) U.S. Cl. .................. 375/232; 375/233; 708/323
(58) Field of Classification Search ........ 375/229–233, 375/346, 348, 350; 708/322–323
  See application file for complete search history.

(56) References Cited

U.S. PATENT DOCUMENTS 3,708,766 A * 1/1973 Sha et al. ............... 333/18
3,716,807 A * 2/1973 Sha et al. ............... 333/18
6,563,868 B1 * 5/2003 Zhang et al. ........... 375/232
7,116,703 B2 * 10/2006 Bouillet et al. ........ 375/148

FOREIGN PATENT DOCUMENTS

CA   2 274 173 A1   1/2000

\* cited by examiner

*Primary Examiner*—Khanh Tran
(74) *Attorney, Agent, or Firm*—Sughrue Mion, PLLC (57) ABSTRACT

Equalizing method and apparatus for single carrier system having an improved equalization performance is disclosed, which includes: a section setting unit for setting filter taps having a predetermined section corresponding to the predicted multi-path; a repeat setting unit for setting filter taps of a repetition section by making the set predetermined section repetitive periodically; and a filter unit for filtering the multi-path by updating the coefficients of the filter taps of the set repetition section. The repeat setting unit sets the filter taps of the repetition section corresponding to an operation characteristic of the filter unit. Accordingly, the apparatus can improve equalization performance by setting filter taps corresponding to the predicted multi-path and updating only the set coefficients of the filter taps. Further, the apparatus can improve equalization performance in dynamic channel circumstances in which the multi-path changes.

14 Claims, 8 Drawing Sheets

EQUALIZING METHOD AND APPARATUS FOR SINGLE CARRIER SYSTEM HAVING AN IMPROVED EQUALIZATION PERFORMANCE

This application claims the priority of Korean Patent Application No. 10-2003-0007589 filed 6 Feb. 2003, in the Korean Intellectual Property Office, the disclosure of which is incorporated herein in its entirety by reference.

BACKGROUND OF THE INVENTION

1. Field of the invention

The present invention relates to an equalizing apparatus in a single carrier system, and more particularly to an equalizing method and apparatus which can improve equalization performance in dynamic channel circumstances.

2. Description of the Prior Art

As generally known in the art, linear equalizers or decision feedback equalizers are used as equalizing apparatuses in a single carrier system.

Figure 1:
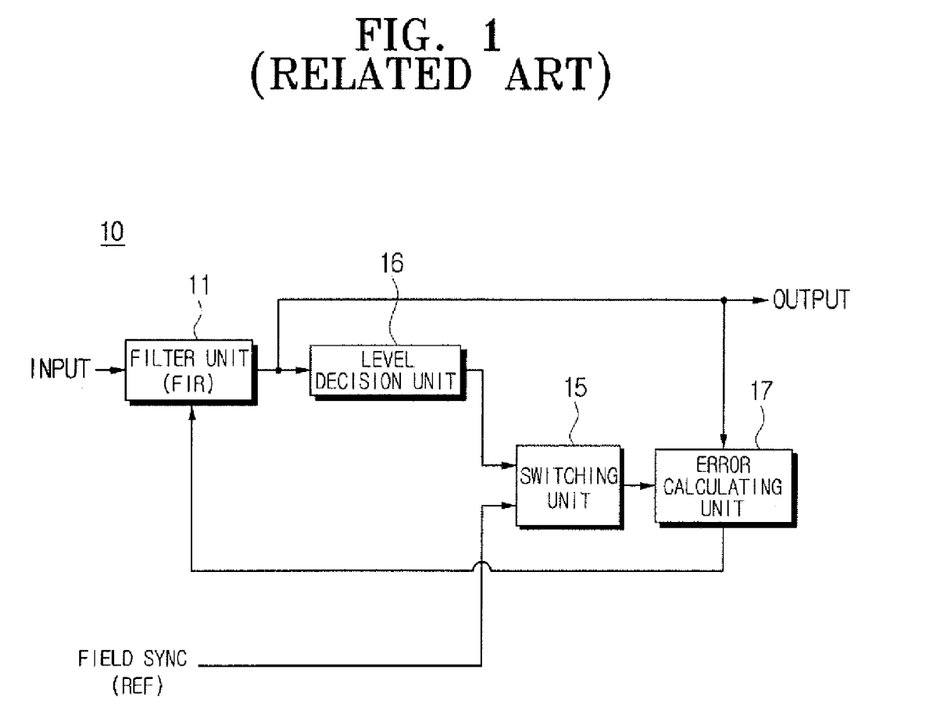
FIG. 1 is a block diagram showing a conventional linear equalizer.

FIG. 1 is a schematic block diagram regarding a linear equalizer 10. A linear equalizer 10 includes a filter unit 11 having a FIR-type filter and a switching unit 15 for operating selectively according to an operation mode of the equalizer. Equalization is performed by repeating a process which obtains an equalization error value corresponding to the operation mode selected by the switching unit 15 and updates coefficients of all filter taps.

When the operation mode is a blind mode, an error calculating unit 17 calculates the equalization error value using an output signal of the filter unit 11 and an output signal of a level decision unit 16 selected by the switching unit 15. Also, when the operation mode is a training mode, the error calculating unit 17 calculates the equalization error value using the output signal of the filter unit 11 and a field sync signal selected by the switching unit 15.

As described above, the equalization error values obtained from each of the operation modes are inputted to the filter unit 11. The filter unit 11 updates coefficients of all the filter taps using the inputted equalization error values. Accordingly, multi-path of a received signal is removed.

Figure 2:
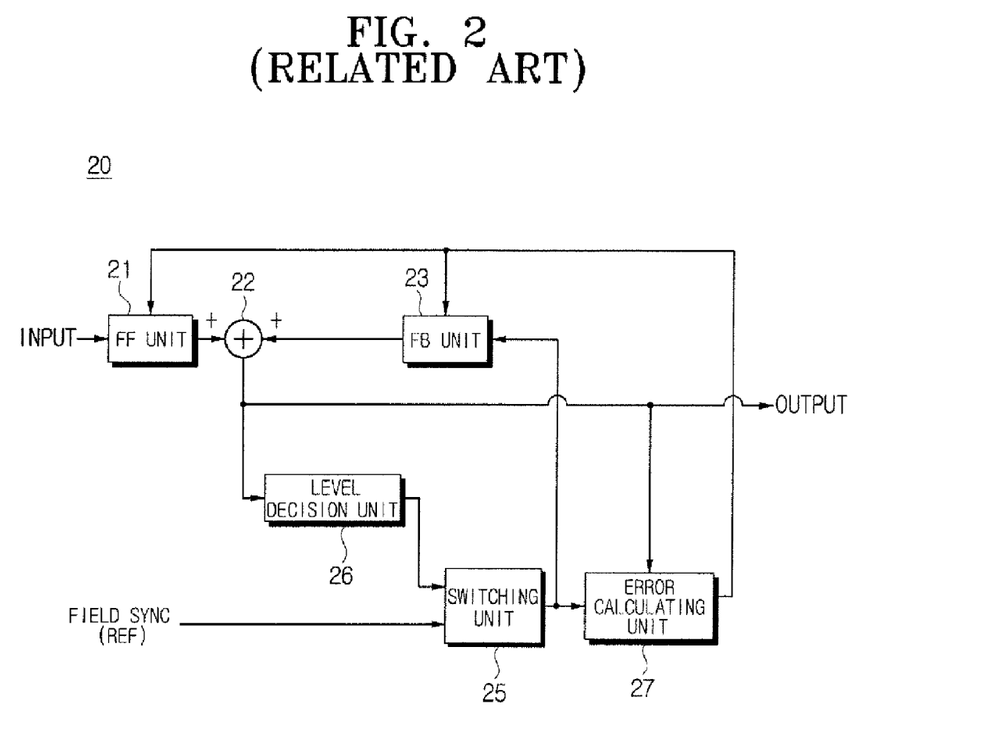
FIG. 2 is a block diagram showing a conventional decision feedback equalizer.

FIG. 2 is a schematic block diagram regarding a decision feedback equalizer 20. The decision feedback equalizer 20 includes a FF (feed forward) section 21 having a FIR-type filter for removing a pre-ghost and post-ghost of a received signal, a FB (feed back) unit 23 having a IIR-type filter for removing a post-ghost of the received signal and a switching unit 25 for operating selectively according to an operation mode of the equalizer 20, which is either a blind mode or a training mode. An equalization is performed by obtaining an equalization error value corresponding to an operation mode selected by the switching unit 25 and updating each coefficient of a filter tap of the FF unit 21 and the FB unit 23.

When the operation mode is a blind mode, an error calculating unit 27 calculates the equalization error value using an output signal of an adder 22 adding output signals of the FF unit 21 and the FB unit 23 and an output signal of a level decision unit 26 selected by the switching unit 25.

Also, when the operation mode is a training mode, the error calculating unit 27 calculates the equalization error value using the output signal of the adder 22 adding the output signals of the FF unit 21 and the FB unit 23 and a field sync signal selected by the switching unit 25.

As described above, the equalization error values obtained from each of the operation modes are inputted to the FF unit 21 and the FB unit 23, respectively. The FF unit 21 and the FB unit 23 update coefficients of all the filter taps using the inputted equalization error values. Accordingly, multi-path of a received signal is removed.

The equalization process of a conventional equalizer described above compensates for the channel distortion of the received signal by updating over and over coefficients of all the filter taps of the FF unit and the FB unit on the basis of the equalization error values obtained from each of the operation modes. However, the conventional equalizer is problematic in that equalization speed decreases since the coefficient of the filter tap corresponding to the multi-path as well as the coefficients of all the filter taps are updated.

SUMMARY OF THE INVENTION

Accordingly, the present invention has been made to solve the above-mentioned problems occurring in the prior art, and an aspect of the present invention is to provide an equalizing apparatus and method which can improve equalization performance in dynamic channel circumstances by updating coefficients of filter taps corresponding to a multi-path.

In order to accomplish this aspect, there is provided an equalizing apparatus comprising: a section setting unit for setting filter taps having a predetermined section corresponding to the predicted multi-path; a repeat setting unit for setting filter taps of a repetition section by making the set predetermined section repetitive periodically; and a filter unit for filtering the multi-path by updating the coefficients of the filter taps of the set repetition section.

The repetition setting section, in an exemplary embodiment, sets the coefficients of the filter taps of the repetition section according to the operation characteristic of the filter unit.

The present invention further comprises an error calculating unit for computing an equalization error value on the basis of the output signal of the filter unit, and the filter unit updates the coefficients of the filter taps of the repetition section on the basis of the equalization error value.

Further, the filter unit includes a FF (feed forward) section for filtering pre-ghosts from among the predicted multi-path and a FB (feed back) section for filtering post-ghosts from among the predicted multi-path. Accordingly, the FF unit updates the coefficients of the filter taps of the repetition section set in accordance with the pre-ghosts, the FB unit updates the coefficients of the filter taps of the repetition section set in accordance with the post-ghosts. In this case, when the FF unit has an overlap operation characteristic, the FF unit updates the coefficients of the filter taps of the repetition section set in accordance with the pre-ghosts and the post-ghosts and performs a filtering operation with respect to the pre-ghosts and the post-ghosts.

Also, in order to accomplish this object, there is provided an equalizing method comprising the steps of: (1) predicting multi-path of a received signal; (2) setting filter taps having a predetermined section corresponding to the predicted multi-path; (3) setting filter taps of a repetition section by making the set predetermined section repetitive periodically; and (4) filtering the multi-path by updating the coefficients of the filter taps the set repetition section.

In an exemplary embodiment, in step 3, the filter taps of the repetition section are set according to the operation characteristic of the filter.

The present invention further comprises a step for computing an equalization error value on the basis of the output signal of step 4. In step 4, the coefficients of the filter taps of the repetition section are updated on the basis of the equalization error value.

Step 4 comprises the steps of: (a) filtering pre-ghosts from among the predicted multi-path and (b) filtering post-ghosts from among the predicted multi-path. Accordingly, the coefficients of the filter taps of the repetition section set in accordance with the pre-ghosts are updated in step a, and the coefficients of the filter taps of the repetition section set in accordance with the post-ghosts are updated in step b.

Accordingly, the present invention can improve equalization performance by setting the filter tap according to the predicted multi-path and updating only the set coefficients of the filter taps. Further, the present invention can improve equalization performance even in dynamic channel circumstances in which the multi-path changes.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENTS

Hereinafter, an exemplary embodiment of the present invention will be described with reference to the accompanying drawings.

Figure 3:
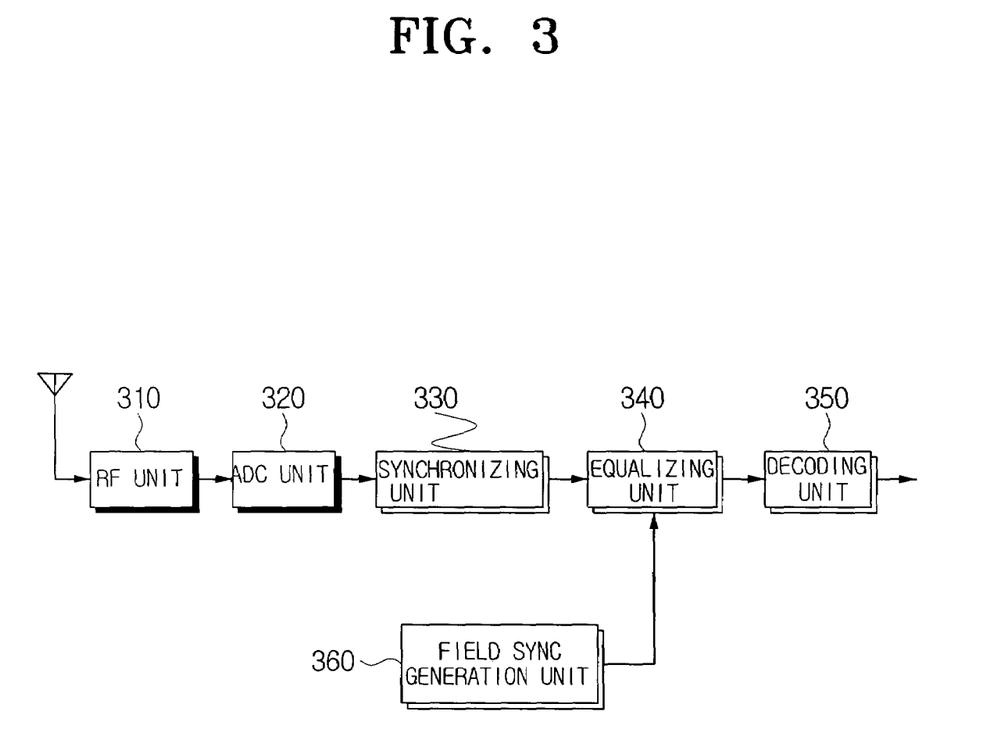
FIG. 3 is a schematic block diagram showing a single carrier system employing an equalizer according to the present invention.

FIG. 3 is a schematic block diagram regarding a single carrier system employing an equalizer having an improved equalization performance according to the present invention.

A single carrier system includes a RF unit 310, an ADC unit (analog to digital converter) 320, a synchronizing unit 330, an equalizing unit 340 and a decoding unit 350.

The RF unit 310 tunes a received single carrier signal and converts the tuned signal into a baseband signal. The ADC unit 320 converts the received analog signal into a digital signal through a digital sampling. The synchronizing unit 330 compensates for a frequency, a phase and a timing offset of the received signal. The equalizing unit 340 compensates for channel distortion of the received signal by updating coefficients of the filter taps set in accordance with to multi-path of the received signal. The decoding unit 350 decodes a data of an input signal equalized by the equalizing unit 340.

Figure 4:
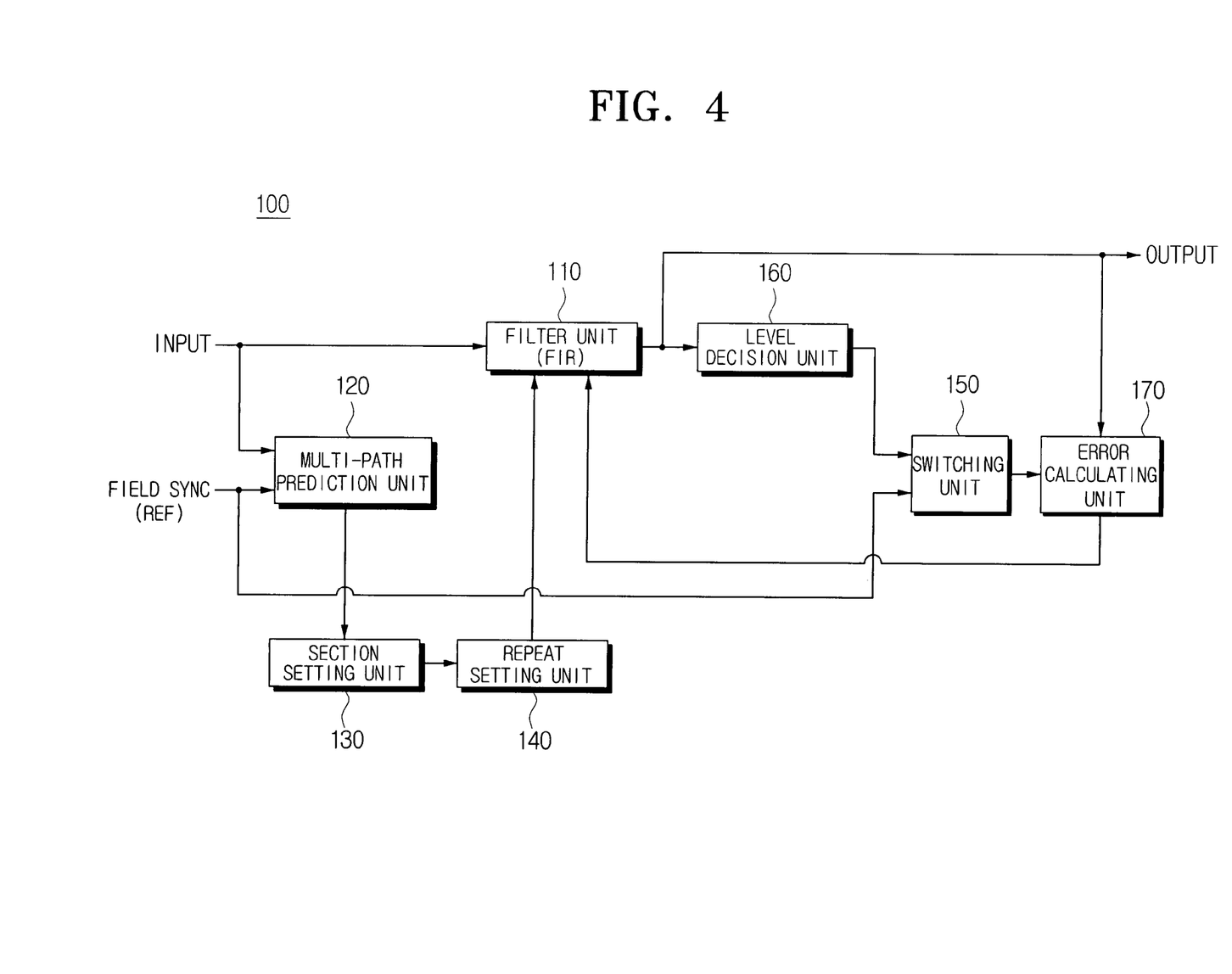
FIG. 4 is a block diagram showing an equalizer according to an embodiment of the present invention.
Figure 5:
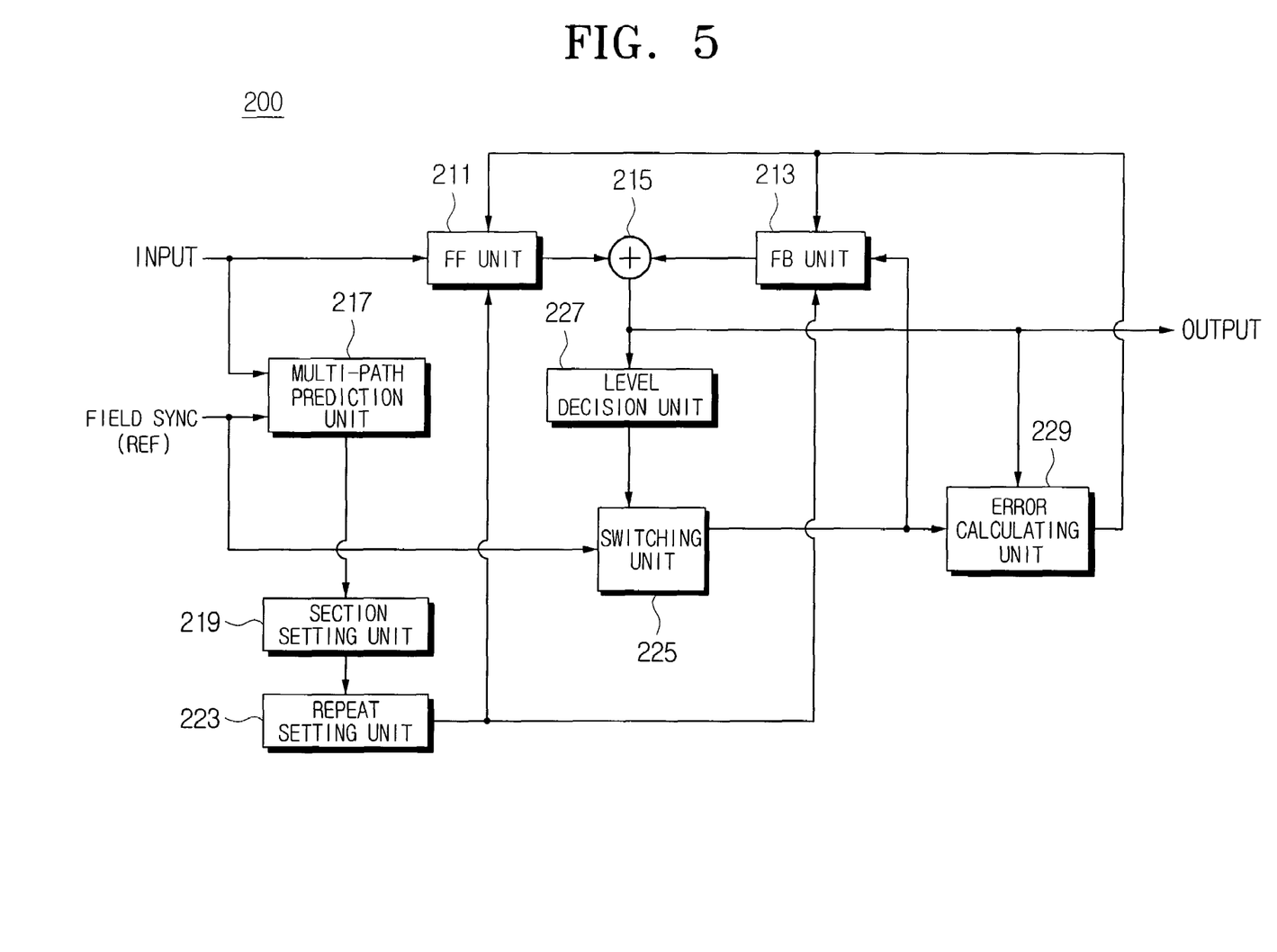
FIG. 5 is a block diagram showing an equalizer according to another embodiment of the present invention.

FIG. 4 and FIG. 5 are block diagrams showing the exemplary embodiment of an equalizer according to the present invention. The equalizing apparatus of the present invention is described in detail with reference to FIG. 4 and FIG. 5.

First, FIG. 4 is an embodiment of the equalizing apparatus according to the present invention and is a block diagram regarding a linear equalizer.

The linear equalizer 100 includes a filter unit 110, a multi-path prediction unit 120, a section setting unit 130, a repeat setting unit 140, a level decision unit 160, a switching unit 150 and an error calculating unit 170.

The filter unit 110 has a FIR-type filter and performs a filtering operation with respect to multi-path of an input signal.

The multi-path prediction unit 120 calculates a correlation value using a correlation relation between a field sync signal and a received signal, then predicts a signal having more than a threshold value as multi-path by means of a predetermined algorithm.

The section setting unit 130 sets sections of filter taps such that the section of the filter taps includes a predetermined number of the filter taps, by considering the filter taps in which the multi-path of the received signal is filtered and a margin of the multi-path on the basis of the predicted multi-path.

The repeat setting unit 140 makes the predetermined section set by the section setting unit 130 repetitive periodically. In this case, the repeated period is set in accordance with an operation characteristic of the filter unit 110.

That is, the number of the filter taps in the predetermined section set by considering the margin of the multi-path is m+1 (m is the number of the filter taps which are added according to the margin). When a filter tap corresponding to a location of the multi-path is the nth filter tap $f_n$, the repetition period becomes n-m number of the filter taps. In this case, n is a natural number, which is larger than m.

For instance, when a filter tap corresponding to a main ghost is $f_0$ and a filter tap corresponding to a post ghost is $f_4$, the section setting unit 130 considers the margin of the multi-path. In this case, when the number of the filter taps becomes two, the number of the filter taps of the set predetermined section becomes three. Accordingly, the filter taps of the predetermined section I1 regarding the main ghost become $f_{-1}$, $f_0$ and $f_1$, and the filter taps of the predetermined section I1 regarding the post ghost become $f_3$, $f_4$ and $f_5$. The repeat setting unit 140 sets an interval between two filter taps (n−m=2) as a period and sets sections of the filter taps which repeat periodically such as $f_7$, $f_8$, $f_9$ and $f_{11}$, $f_{12}$, $f_{13}$. (In this case, a previous filter tap of the main filter tap $f_0$ is expressed by — and a following filter tap of the main filter tap $f_0$ is expressed by +).

The repeat setting unit 140 provides a predetermined control signal to the filter tap of the repetition section set as described above. Next, the filter unit 110 compensates for the multi-path, which is the post-ghost, by updating the coefficients of the filter taps of the set filter tap section.

The switching unit 150 performs a switching operation according to a training mode and a blind mode, which are operation modes of the equalizer.

The level decision unit 160 determines the output signal of the filter unit 110 to be a predetermined level and then outputs the level-determined output signal.

The error calculating unit 170 calculates an equalization error value on the basis of an output signal of the switching unit 150, of which the output signal is switched according to the operation mode. That is, the error calculating unit 170 calculates the equalization error value with respect to the output signal of the filter unit 110 on the basis of the output signal of the level decision unit 160 in the blind mode. Further, the error calculating unit 170 calculates the equalization error value with respect to the output signal of the filter unit 110 on the basis of a field sync signal in the training mode.

The equalization error values calculated in each of the operation modes as described above are inputted to the filter unit 110, the filter unit 110 updates only the coefficient of the filter tap set over and over on the basis of the predetermined control signal provided from the repeat setting unit 140.

FIG. 5 is another embodiment according to the present invention and is a more detailed block diagram regarding a decision feedback equalizer.

The decision feedback equalizer 200 includes a FF unit 211, a FB unit 213, an adder 215, a multi-path prediction unit 217, a section setting unit 219, a repeat setting unit 223, a switching unit 225, a level decision unit 227, and an error calculating unit 229.

The FF (Feed Forward) section 211 is a filter having a FIR-type filter and removes a pre-ghost from among multi-path. When the FF unit 211 is an overlapped feed forward filter, it also removes a predetermined number of post-ghosts.

The FB (Feed Back) section 213 is a filter having an IIR-type filter and removes a post-ghost.

The adder 215 adds the output signal outputted from the FF unit 211 and the output signal outputted from the FB unit 213 and outputs the added signal.

The multi-path prediction unit 217 calculates a correlation value using a correlation relation between a field sync signal and a received signal, then predicts a signal having more than a threshold value as multi-path by means of a predetermined algorithm.

As described above, the section setting unit 219 sets a section of filter taps such that the section of the filter taps includes a predetermined number of the filter taps, by considering the filter taps in which the multi-path of the received signal is filtered and a margin of the multi-path on the basis of the predicted multi-path.

The repeat setting unit 223 makes the predetermined section set by the section setting unit 219 repetitive periodically. In this case, the repeated period is set in accordance with an operation characteristic of the FB unit 211.

That is, the number of the filter taps in the predetermined section set by considering the margin of the multi-path is m+1 (m is the number of the filter taps which are added according to the margin). When a filter tap corresponding to a location of the multi-path is the nth filter tap $f_n$, the repeated period becomes n−m number of the filter taps. In this case, n is a natural number, which is larger than m.

The repeat setting unit 223 provides a predetermined control signal corresponding to the section of the filter tap set over and over to the FF unit 211 and the FB unit 213, respectively.

That is, the repeat setting unit 223 provides the FIR filter of the FF unit 211 with a predetermined control signal corresponding to the section of the filter tap set over and over with respect to the main-ghost and post-ghost from among the predicted multi-path. Then, the repeat setting unit 223 provides the FF unit 211 having an overlap characteristic with a predetermined control signal corresponding to the section of the filter tap set with respect to the pre-ghost. Further, the repeat setting unit 223 provides the IIR filter of the FB unit 213 with a predetermined control signal corresponding to the section of the filter tap set over and over with respect to the post-ghost from among the predicted multi-path.

Next, the FF unit 211 and the FB unit 213 compensates for the multi-path by updating the coefficients of the filter taps of the section of the filter tap set over and over, by means of the predetermined control signal.

The switching unit 225 performs a switching operation according to the training mode and blind mode, which are the operation modes of the equalizer.

The level decision unit 227 outputs a signal having a predetermined level determined according to the output signal of the adder 215.

The error calculating unit 229 calculates an equalization error value on the basis of the output signal of the switching unit 225 which is switched according to the operation mode. That is, the error calculating unit 229 calculates the equalization error value with respect to the output signal of the adder 215 on the basis of the output signal of the level decision unit 227 in the blind mode. Further, the error calculating unit 229 calculates the equalization error value with respect to the output signal of the adder 215 on the basis of a field sync signal in the training mode.

The equalization error values calculated in each of the operation modes as described above are inputted to the FF unit 211 and the FB unit 213, respectively, and the FF unit 211 and the FB unit 213 update only the coefficient of the filter tap provided from the repeat setting unit 223.

Hereinafter, referring to FIG. 6a to FIG. 7c, a process of setting the section of the filter tap is described in detail, which is set over and over by means of the section setting unit 219 and the repeat setting unit 223 of the decision feedback equalizer 200. The FF unit 211 described in FIG. 6a to FIG. 7c has a FIR-type filter and an overlap operation characteristic which compensates for a predetermined number of post-ghosts. Further, an equalizing method of an equalizing apparatus according to the present invention is described with reference to FIG. 8.

Figure 6A:
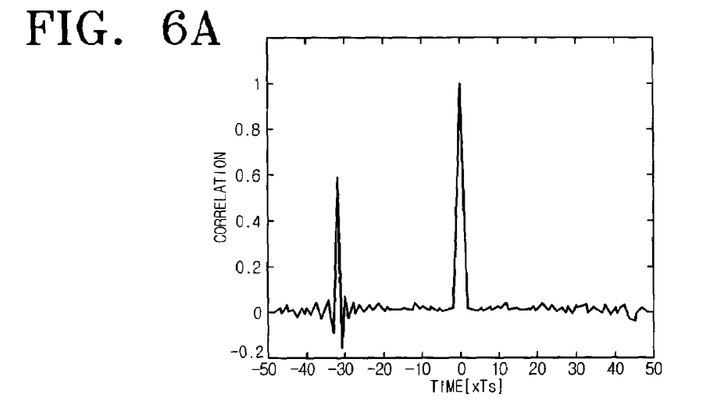
FIGS. 6a-6c are views illustrating a process in which a filter tap is set when pre-ghosts exist in a received signal.
Figure 6B:
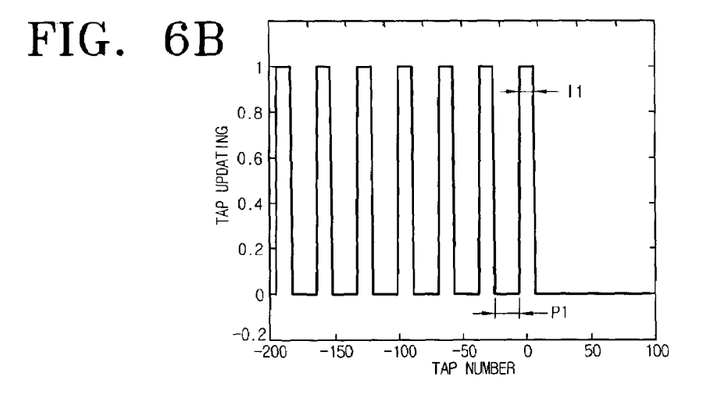
Figure 6C:
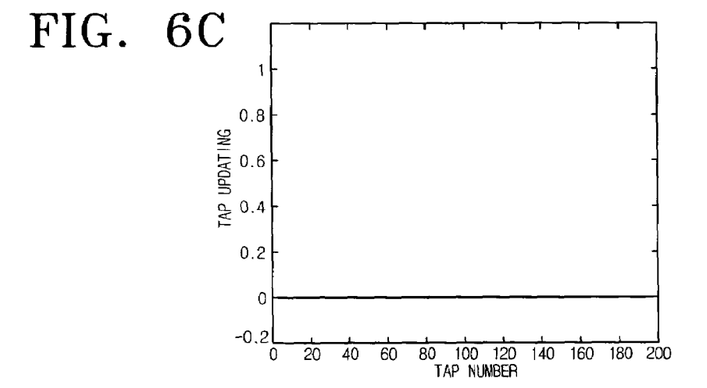

FIG. 6a-6c are views illustrating a case in which only pre-ghosts exist. FIG. 6a is a view illustrating multi-path predicted by the multi-path prediction unit 217 using a correlation relation between a received signal and a field sync signal, with respect to the received signal having a main-ghost (0Ts, 0dB) and a pre-ghost (−32Ts, −3dB) in step 811.

In step 813, the section setting unit 219 considers a corresponding filter tap and filter tap margin according to the multi-path on the basis of a location of the multi-path predicted as shown in FIG. 6a, and sets the filter tap section (I1) having a predetermined section as shown in FIG. 6b. In step 815, the repeat setting unit 223 sets the filter tap sections (I1) having a predetermined section so that the filter tap sections (I1) are periodically repeated (P1).

Typically, the FF unit 211 has a FIR-type filter and removes ghosts by reducing the ghosts gradually. The compensation characteristic of the filter having the FIR-type filter is that the filter sets a latency time for a main-ghost as a period and performs a filtering operation with respect to the ghosts while reducing the size of the ghosts gradually.

That is, the repeat setting unit 223 sets the filter tap for filtering the ghost which occurs periodically by means of the FIR-type filter, by setting the filter tap section having a predetermined section, which repeats periodically.

In step 815, the repeat setting unit 223 provides a predetermined control signal '1' to the periodically repeated filter taps from among all filter taps of the FF unit 211 as shown in FIG. 6b, and provides a predetermined control signal '0' to the rest of the filter taps.

Accordingly, the FF unit 211 updates the coefficient of the filter tap set on the basis of the equalization error value calculated by the error calculating unit 229 in order to perform an equalization in step 817.

Also, since the post-ghosts do not exist as shown in FIG. 6a, the repeat setting unit 223 provides a predetermined control signal '0' to all filter taps of the FB unit 213. Accordingly, the FB unit 213 does not update the coefficients of all the filter taps, that is, the FB unit 213 does not operate.

Accordingly, the present invention can improve an equalization speed by setting only minimum filter taps having an effect on an equalization performance for the multi-path of the received signal and updating the set coefficient of the filter tap.

Figure 7A:
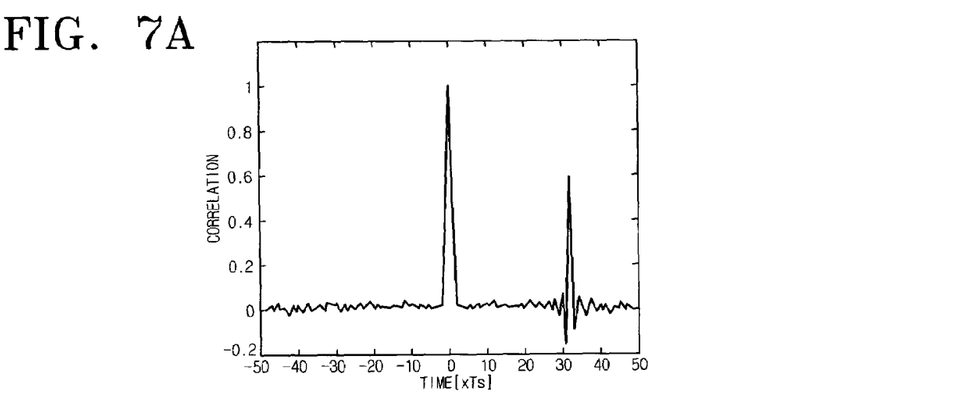
FIGS. 7a-7c are views illustrating a process in which a filter tap is set when post-ghosts exist in a received signal.
Figure 7B:
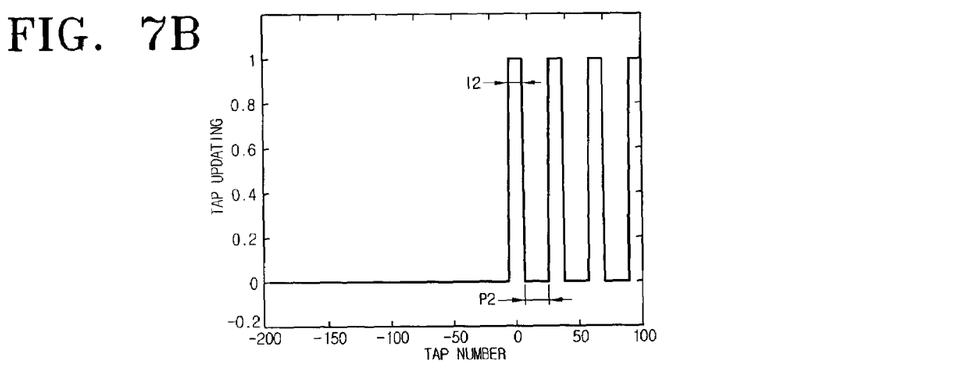
Figure 7C:
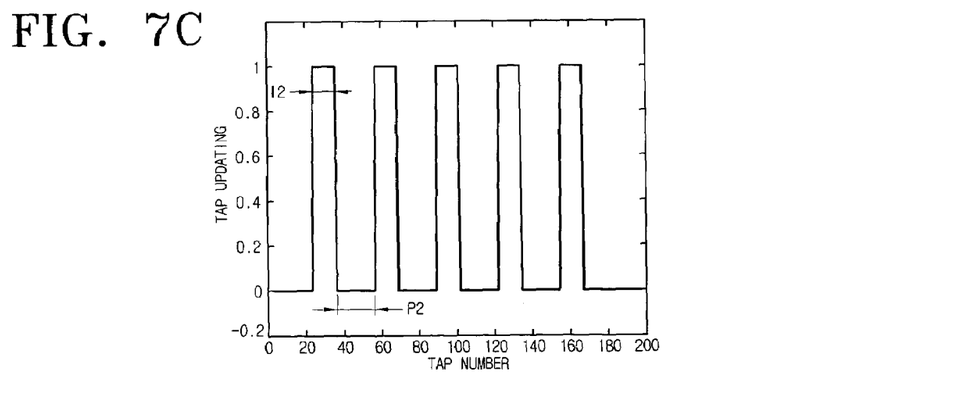
Figure 8:
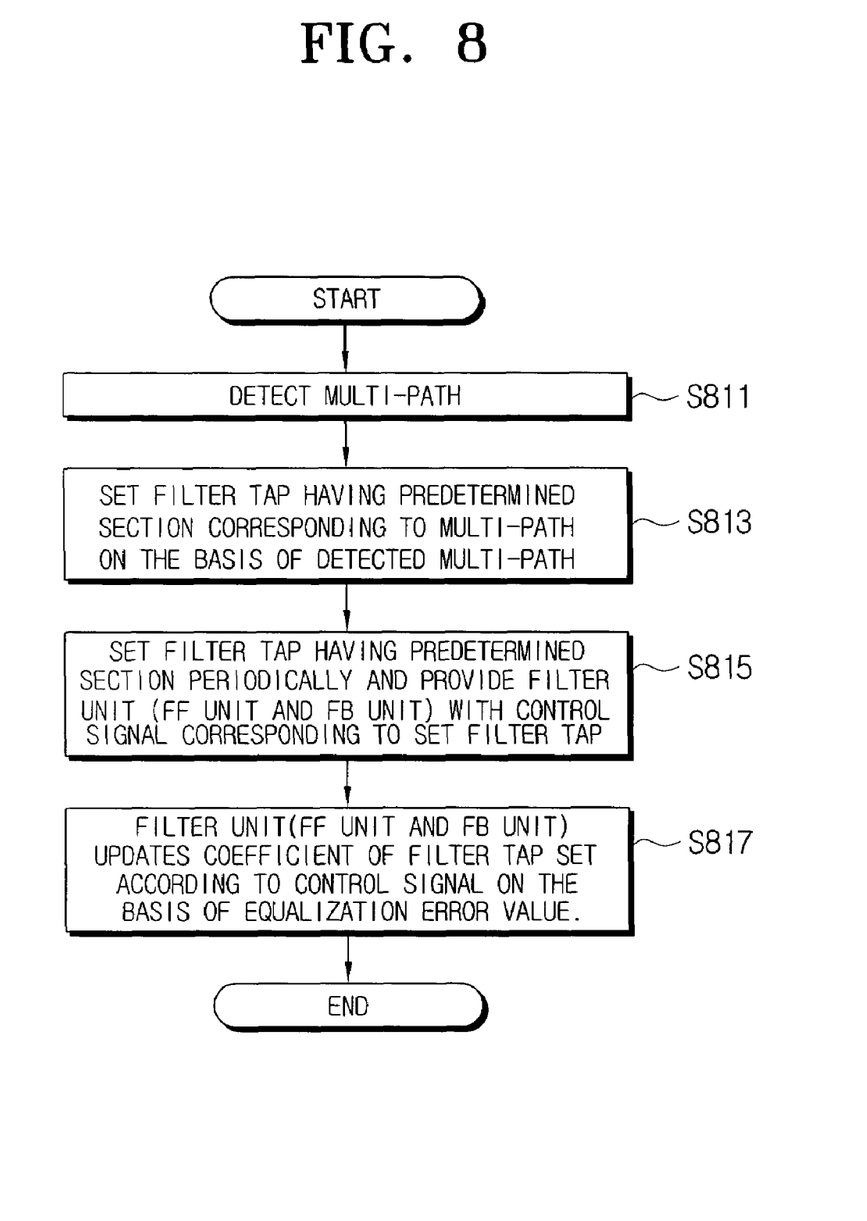
FIG. 8 is a flow chart showing an equalizing method of an equalizer according to the present invention.

FIG. 7a-7c are views illustrating a case in which only post-ghosts exist. FIG. 7a is a graph of illustrating multi-path predicted by the multi-path prediction unit 217 using a correlation relation between a received signal and a field sync signal, with respect to the received signal having a main-ghost (0Ts, 0dB) and a post-ghost (32Ts, 3dB) in step 811.

In step 813, the section setting unit 219 considers a corresponding filter tap and filter tap margin on the basis of a location of the multi-path predicted as shown in FIG. 7a, and sets filter taps having a predetermined section (12) as shown in FIG. 7b. In step 815, the repeat setting unit 223 sets the filter tap sections (I2) having a predetermined section such that the filter tap sections (I2) are periodically repeated (P2).

The FF unit 211 compensates for post-ghosts having a predetermined section according to an overlap characteristic. Then, the repeat setting unit 223 sets the filter taps having a predetermined section corresponding to the post-ghosts such that the filter taps having a predetermined section are periodically repeated.

The repeat setting unit 223 provides a predetermined control signal '1' to filter taps having a predetermined section set over and over corresponding to the main-ghost and post-ghost from among the all filter taps.

Also, as shown in FIG. 7c, the repeat setting unit 223 provides a predetermined control signal '1' to filter taps having a predetermined section (I2) set periodically (P2) corresponding to the post-ghost.

That is, when the pre-ghosts do not exist, the FF unit 211 updates coefficients of filter taps compensating for the main-ghost and coefficients of filter taps compensating for the post-ghost according to an overlap operation characteristic from among all filter taps.

Next, the FF unit 211 and FB unit 213 update the coefficient of the filter tap set in accordance with the multi-path set by the repeat setting unit 223 as shown in FIG. 7b and FIG. 7c, on the basis of the equalization error value obtained by the error calculating unit 229, and thus perform an equalization in step 817.

Accordingly, the present invention can improve an equalization speed by updating the part of the filter taps set in accordance with the multi-path from among all filter taps of the FF unit 211 and FB unit 213. Further, the present invention can improve equalization performance in dynamic channel circumstances in which the multi-path changes.

According to the present invention, the received multi-path is predicted and the filter taps are set in accordance with the predicted multi-path, and the set coefficients of the filter taps are updated. Accordingly, the present invention can improve equalization speed than the prior equalizer updating all the filter taps and equalization performance in dynamic channel circumstances in which the multi-path changes.

Further, the present invention can prevent a possible reduction of a performance by setting the filter taps having a predetermined section after considering not only the filter taps corresponding to the predicted multi-path, but also the margin of the multi-path, and setting the filter taps having a predetermined section over and over after considering the operation characteristic of the FIR-type filter.

Accordingly, the present invention can improve equalization performance in dynamic channel circumstances in which the multi-path changes.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An equalization apparatus in a single carrier system, the apparatus comprising:
   a multi-path prediction unit for predicting multi-path of a received signal;
   a section setting unit for setting a filter tap section to include a predetermined number of filter taps corresponding to the predicted multi-path thereby to produce a set predetermined section;
   a repeat setting unit for setting filter taps of a repetition section by making the set filter tap section repetitive periodically thereby to produce a set repetition section; and
   a filter unit for filtering the multi-path by updating coefficients of the filter taps of the set repetition section.

2. The equalization apparatus as claimed in claim 1, wherein the repeat setting unit sets the filter taps of the repetition section according to an operation characteristic of the filter unit.

3. The equalization apparatus as claimed in claim 1, further comprising an error calculation section for calculating an equalization error value on a basis of an output signal of the filter unit,
   the filter unit updating the coefficients of the filter taps of the set repetition section on a basis of the equalization error value.

4. An equalization apparatus in a single carrier system, the apparatus comprising:
   a multi-path prediction unit for predicting multi-path of a received signal;
   a section setting unit for setting a filter tap section to include a predetermined number of filter taps corresponding to the predicted multi-path thereby to produce a set predetermined section;
   a repeat setting unit for setting a repetition section by making the set filter tap section repetitive periodically thereby to produce a set repetitive section;
   a feed forward (FF) unit for filtering pre-ghosts from among the predicted multi-path; and
   a feed back (FB) unit for filtering post-ghosts from among the predicted multi-path.

5. The equalization apparatus as claimed in claim 4, wherein the repeat setting unit sets the repetition section according to an operation characteristic of the FF unit and the FB unit.

6. The equalization apparatus as claimed in claim 4, further comprising an error calculation section for calculating an equalization error value on a basis of an output signal of the FF unit and the FB unit, the FF unit and the FB unit updating coefficients of the filter taps of the set repetition section on a basis of the equalization error value.

7. The equalization apparatus as claimed in claim 6, wherein the FF unit updates coefficients of the filter taps of the set repetition section set in accordance with the pre-ghosts, and the FB unit updates coefficients of the filter taps of the set repetition section set in accordance with the post-ghosts.

8. The equalization apparatus as claimed in claim 4, wherein the FF unit updates coefficients of the filter taps of the set repetition section set in accordance with the pre-ghosts and post-ghosts, and performs a filtering operation with respect to the pre-ghosts and the post-ghosts.

9. An equalization method in a single carrier system, the method comprising the steps of:
   (1) predicting multi-path of a received signal;
   (2) setting a filter tap section to include a predetermined number of filter taps corresponding to the predicted multi-path thereby to produce a set predetermined section;
   (3) setting filter taps of a repetition section by making the set filter tap section repetitive periodically thereby to produce a set repetitive section; and
   (4) filtering the multi-path by updating coefficients of the filter taps of the set repetition section.

10. The method as claimed in claim 9, wherein, in step 3, the filter taps of the repetition section are set according to an operation characteristic of the filtering.

11. The method as claimed in claim 9, further comprising a step of calculating an equalization error value on a basis of an output signal of step 4, wherein, in step 4, the coefficients of the filter taps of the set repetition section are updated on a basis of the equalization error value.

12. The method as claimed in claim 9, wherein, step 4 comprises the steps of:
   (a) filtering pre-ghosts from among the predicted multi-path; and
   (b) filtering post-ghosts from among the predicted multi-path.

13. The method as claimed in claim 12, wherein, the coefficients of the filter taps of the set repetition section set in accordance with the pre-ghosts are updated in step a, and the coefficients of the filter taps of the set repetition section set in accordance with the post-ghosts are updated in step b.

14. The method as claimed in claim 12 wherein, in step a, the coefficients of the filter taps of the set repetition section set in accordance with the pre-ghosts and post-ghosts are updated, and a filtering operation is performed with respect to the pre-ghosts and post-ghosts.

* * * * *